United States Patent
Perry et al.

(10) Patent No.: US 10,457,857 B2
(45) Date of Patent: Oct. 29, 2019

(54) METHOD OF FRACKING USING SILICONE SURFACTANTS

(71) Applicants: GENERAL ELECTRIC COMPANY, Schenectady, NY (US); UNIVERSITY OF PITTSBURGH—OF THE COMMONWEALTH SYSTEM OF HIGHER EDUCATION, Pittsburgh, PA (US)

(72) Inventors: Robert James Perry, Niskayuna, NY (US); Robert Michael Enick, Bethel Park, PA (US); Jason Jiwoo Lee, Pittsburgh, PA (US); Eric Beckman, Aspinwall, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/234,314

(22) Filed: Aug. 11, 2016

(65) Prior Publication Data
US 2018/0044573 A1 Feb. 15, 2018

(51) Int. Cl.
 *E21B 43/26* (2006.01)
 *C09K 8/60* (2006.01)
 *C09K 8/70* (2006.01)

(52) U.S. Cl.
 CPC .............. *C09K 8/703* (2013.01); *C09K 8/602* (2013.01)

(58) Field of Classification Search
 None
 See application file for complete search history.

(56) References Cited

U.S. PATENT DOCUMENTS

| | | | |
|---|---|---|---|
| 4,391,327 A | 7/1983 | De Carlo | |
| 4,519,455 A * | 5/1985 | Holtmyer | E21B 43/26 166/305.1 |
| 4,554,082 A | 11/1985 | Holtmyer et al. | |
| 5,279,367 A | 1/1994 | Osterloh | |
| 5,325,920 A | 7/1994 | Djabbarah | |
| 6,509,300 B1 * | 1/2003 | Gupta | C09K 8/685 166/308.3 |
| 6,864,314 B1 * | 3/2005 | Yeung | A61K 8/90 424/70.27 |
| 7,803,744 B2 | 9/2010 | Chen et al. | |
| 8,550,165 B2 | 10/2013 | Gupta et al. | |
| 8,579,035 B2 | 11/2013 | Lehrer et al. | |
| 8,973,668 B2 | 3/2015 | Sanders et al. | |
| 9,874,079 B2 * | 1/2018 | Sanders | E21B 43/164 |
| 10,010,813 B2 * | 7/2018 | Ferrari | B01D 17/047 |

(Continued)

FOREIGN PATENT DOCUMENTS

| | | |
|---|---|---|
| CN | 85108889 A | 6/1987 |
| EP | 0150112 B1 | 6/1988 |

OTHER PUBLICATIONS

Greenhorn et al., "Investigation of High Phase Volume Liquid CO Fracturing Fluids", Petroleum Society of Canada, pp. 12, CIM No. 85-36-34, 1985.

(Continued)

*Primary Examiner* — Angela M DiTrani Leff
(74) *Attorney, Agent, or Firm* — Baker Hughes Patent Organization (57) ABSTRACT

Methods for fracking, particularly dry fracking, comprising the use of surfactants for preparation of substantially water-free carbon dioxide in oil foams are presented.

19 Claims, 3 Drawing Sheets

(56) References Cited

U.S. PATENT DOCUMENTS

| | | | |
|---|---|---|---|
| 2002/0119898 A1* | 8/2002 | Kevelam | C11D 3/42 |
| | | | 510/285 |
| 2002/0194681 A1* | 12/2002 | DeYoung | B08B 7/0021 |
| | | | 8/158 |
| 2012/0125644 A1* | 5/2012 | Zhou | C09K 8/594 |
| | | | 166/403 |
| 2014/0131046 A1 | 5/2014 | Al-Otaibi et al. | |

OTHER PUBLICATIONS

Lancaster et al., "High Phase Volume Liquid CO2 Fracturing Fluids", Petroleum Society of Canada, pp. 7, CIM 87-38-71, 1987.

Levitt et al., "Identification and Evaluation of High-Performance EOR Surfactants", Society of Petroleum Engineers, SPE/DOE Symposium on Improved Oil Recovery, 2006. pp. 12.

\* cited by examiner

METHOD OF FRACKING USING SILICONE SURFACTANTS

STATEMENT REGARDING FEDERALLY SPONSORED RESEARCH & DEVELOPMENT

This invention was made with Government support under contract number DE-AR0000292 awarded by the Department Of Energy. The Government has certain rights in the invention.

BACKGROUND

The disclosure relates generally to improvements in petroleum recovery and gas recovery processes in the field.

Liquid carbon dioxide ($CO_2$) is an attractive fluid for many hydraulic fracturing applications because it contains no water (i.e., it is "dry") and therefore does not damage water-sensitive sandstone or shale formations. The use of pure or substantially high loadings of $CO_2$ in fracking for petroleum and gas recovery is affected by the low viscosity of $CO_2$ which reduces the fracture size and does not allow for effective proppant suspension and delivery to the fracture sites. Thus pure $CO_2$ remains an ineffective dry fracking fluid because the low viscosity of liquid $CO_2$ does not permit effective fracturing of the rock strata to generate the fissures needed for efficient petroleum or gas extraction In some known methods, liquid $CO_2$ has been combined with an aqueous surfactant solution to generate $CO_2$-in-water (i.e. bubbles of liquid $CO_2$ inside of thin films of surfactant-stabilized water) emulsions or foams for hydraulic fracturing that have a high apparent viscosity. The aqueous phase has included a water-soluble alcohol. However, the presence of water in these previously described $CO_2$-in-water foams renders them "wet".

A dry emulsion or foam can be composed of bubbles of high pressure liquid separated by films of surfactant-stabilized oil if the $CO_2$ and oil are not miscible. Although conventional surfactants with hydrophobic and hydrophilic segments have been used to form stabilized $CO_2$ emulsions or foams which are injected into the well bore, the foam strength varies depending on the surfactant used. R.E. Greenhorn and E. Li Petroleum Society of Canada, Paper Number-85-36-34, Annual Technical Meeting, Jun. 2-5, 1985, Edmonton, Alberta; G. W. Lancaster et al., Petroleum Society of Canada Paper Number 87-38-71, Annual Technical Meeting, Jun. 7-10, 1987, Calgary, Alberta. There is an ongoing need in the field for design and optimization of chemical structure and compositions of $CO_2$ foaming agents under realistic reservoir temperature and pressure conditions.

BRIEF DESCRIPTION

Provided herein are polymeric and oligomeric surfactants comprised of silicone and hydrocarbon components for generation of stable $CO_2$-in-oil foams for use in substantially waterless fracking applications for petroleum and/or gas recovery. The surfactants described herein comprise $CO_2$-philic and oil-philic moieties and are substantially free of hydrophilic moieties, thereby generating substantially "dry" (waterless) and stable $CO_2$-in-oil emulsions or foams that are more viscous than pure $CO_2$ and are suitable for use in petroleum recovery or gas recovery from subterranean petroleum or gas formations In one aspect, provided herein is a method for petroleum recovery or gas recovery from subterranean petroleum or gas formations, the method comprising
admixing liquefied carbon dioxide with a solution of an oil and a surfactant to obtain a substantially water-free foam; and
injecting the substantially water-free foam into a well;
wherein said surfactant is soluble in the oil, does not gel the oil, and comprises two hydrophobic components:
a first hydrophobic component that is miscible with the oil; and a second hydrophobic component that is miscible with liquefied carbon dioxide and non-reactive with carbon dioxide;
wherein the method is a substantially water-free fracking method for petroleum recovery or gas recovery.

Methods for fracking, particularly dry fracking, comprising the use of surfactants for preparation of substantially water-free carbon dioxide in oil foams are presented.

DRAWINGS

These and other features, aspects, and advantages of the present invention will become better understood when the following detailed description is read with reference to the accompanying drawings in which like characters represent like parts throughout the drawings, wherein:

FIG. 1 shows a schematic representation of a fracturing operation involving the use of methods described herein. Sand is mixed with a solution of a surfactant and an oil in a centrifugal pump blender. Carbon dioxide is delivered in refrigerated trucks having a temperature of −25° C., and vapor pressure of about 250 psi. The liquefied carbon dioxide and the blend from the centrifugal pump blender are combined under high pressure at the wellhead and the resulting foam is injected into the well.

FIG. 2A and FIG. 2B show high pressure (1500-5000 psi) $CO_2$-in-oil emulsions at ~22° C. comprising surfactant 4 (A) and surfactant 10 (B) respectively. In both cases comparable amounts of liquid $CO_2$ and mineral oil (containing 2 wt % of the dissolved surfactant) were introduced to the cell. Surfactant 4 generated a high volume fraction $CO_2$-in-oil foam at the bottom of the cell and an excess oil phase above it. Surfactant 10 generated an emulsion with much smaller droplets that consumed the entire contents of the cell.

DETAILED DESCRIPTION

Fracking (also known as hydraulic fracturing, hydrofracturing, hydrofracking, fracing or fraccing) involves the high-pressure injection of 'fracking fluid' (typically water, containing sand or other proppants suspended with the aid of thickening agents) into a wellbore to create cracks or force open existing fissures in the deep-rock formations through which natural gas, or petroleum, can be extracted. When the hydraulic pressure is removed from the well, small grains of hydraulic fracturing proppants (e.g., sand and/or aluminum oxide) hold the fractures open. The extracted petroleum and/or gas is separated from the produced water. "Dry" fracking involves injection of a fracking fluid that does not contain water (e.g. liquid propane, liquefied petroleum gas (LPG), natural gas liquids (NGL), high pressure methane, liquid ethane, gasoline, vegetable oil, mineral oil, crude oil, diesel, liquid or supercritical carbon dioxide, gelled propane, gelled LPG, gelled gasoline, gelled diesel, gelled oil, nitrogen-in-$CO_2$ foams, and $CO_2$-in-oil emulsions or foams).

Described herein are dry fracking methods comprising generation of substantially water free carbon dioxide-in-oil foams which are injected into a well. The stable foams described herein have an apparent viscosity that is much greater than that of $CO_2$ and can transport higher concentrations of larger proppant particles than liquefied carbon dioxide alone, thereby increasing the efficiency of the dry fracking process during recovery of petroleum or gas. Further the foams are substantially water-free thereby eliminating the need to inject water and reducing the amount of produced water during petroleum or gas extraction, which is advantageous in regions where water is a scarce resource. Dry $CO_2$-in-oil emulsions or foams are particularly advantageous for use when fracturing water-sensitive formations. A further advantage of the substantially water-less carbon dioxide-in-oil foams described herein is that there is reduced need for separation of water from the extracted petroleum or gas which reduces production costs.

Previously known carbon dioxide in oil emulsions or foams employed conventional surfactants which typically comprised a hydrophilic component. As neither the condensed $CO_2$ nor the oil is hydrophilic, conventional surfactants comprising hydrophilic components lead to inferior foams compared to the foams described herein. In our hands, previously described emulsions were unstable, or were stable only for minutes. Further, addition of certain conventional surfactants to the oil cause the oil to gel, which makes the pumping of the oil to the wellhead difficult during field operations.

By contrast, the emulsions and foams produced by the methods described herein comprise novel surfactants having two hydrophobic components: a carbon dioxide-philic component which is oil-phobic, and an oil-philic component that is $CO_2$-phobic. The surfactant is more oil soluble than $CO_2$-soluble (i.e., the oil phase is the continuous phase in accordance with Bancroft's rule) which enables the surfactant to stabilize thin films of oil. Advantageously, the surfactant does not cause the oil phase to gel. Accordingly, the novel surfactants described herein (e.g., surfactants of Formula I, II, III, IV or V) and the novel methods of using such surfactants described herein allow for preparation of stable foams or emulsions which are stable for at least a few hours as described in more detail in the Examples section. Further, the emulsions or foams described herein have higher viscosities than pure $CO_2$, which viscosities are sufficient to transport high concentrations of proppant material. Accordingly, the novel surfactants described herein allow for stabilization of $CO_2$-in-oil emulsions or foams for dry (substantially water-free) fracking.

As used herein, a well is a hole drilled in the earth for the purpose of finding or producing crude petroleum or natural gas. The well is typically drilled into an unconventional formation (e.g. shale) that has such low permeability that it is fractured in order to achieve economically viable petroleum and/or gas recovery.

As used herein, an oil may be of animal (e.g., fish oil), vegetable, or petrochemical origin. In some embodiments, the oil is a mineral oil (i.e., a higher alkane distillate of crude petroleum). In some embodiments, the oil is diesel, jet fuel, kerosene and the like.

As used herein, "liquefied carbon dioxide" or "liquefied $CO_2$" refers to any condensed form of carbon dioxide, where the $CO_2$ may be in liquid phase (e.g., at temperatures below the critical temperature of $CO_2$) or the $CO_2$ may be in supercritical phase (e.g., at temperatures above the critical temperature of $CO_2$) such that the $CO_2$ can be admixed with a solution of an oil and a surfactant.

The term "foam" includes liquid-liquid emulsions (high pressure surfactant-stabilized $CO_2$-in-oil systems at temperatures below the critical temperature of $CO_2$ in which the $CO_2$ is in the liquid phase) or liquid-supercritical phase foams, (high pressure surfactant-stabilized $CO_2$-in-oil systems at temperatures above the critical temperature of $CO_2$ in which the $CO_2$ is in the supercritical phase). In some embodiments, a foam is a liquid-liquid $CO_2$ in oil emulsion. In other embodiments, a foam is a liquid-supercritical phase $CO_2$ in oil foam. For the purpose of this disclosure the term foam is used interchangeably with emulsion.

As used herein, "alkyl" refers to a straight- or branched-chain alkyl group comprising from 1 to 250 carbon atoms. Examples of alkyl groups include methyl, ethyl, n-propyl, isopropyl, butyl, isobutyl, sec-butyl, tert-butyl, pentyl, isopentyl, tert-pentyl, hexyl, isohexyl, and groups that, in light of the ordinary skill in the art and the teachings provided herein would be considered equivalent to any one of the examples provided herein. In some embodiments, alkyl groups encompass polyisobutylene and polypropylene oligomeric side chains. In some embodiments, an alkyl group is a $C_1$-$C_{250}$ alkyl group. In some embodiments, an alkyl group is a $C_{10}$-$C_{250}$ alkyl group. In some embodiments, an alkyl group is a $C_{10}$-$C_{200}$ alkyl group. In some embodiments an alkyl group is a $C_1$-$C_{250}$ linear alkyl group. In other embodiments, an alkyl group is a $C_1$-$C_{250}$ branched alkyl group. The choice of the alkyl group can result in the surfactant having a linear, branched, star or comb structure. In some embodiments, alkyl groups may also be cross linked to provide star and/or cross-linked surfactants. In other embodiments, alkyl groups are substantially free of cross-linking.

As used herein, "alkene" refers to an alkyl group having at least one unsaturated bond. Examples of alkenyl groups include ethene, propene, isopropene, butane, isobutene, pentene, hexene, and groups that, in light of the ordinary skill in the art and the teachings provided herein would be considered equivalent to any one of the examples provided herein. In some embodiments, an alkene group is a $C_1$-$C_{250}$ alkene group. In some embodiments, an alkene group is a $C_{10}$-$C_{250}$ alkene group. In some embodiments, an alkene group is a $C_{10}$-$C_{200}$ alkene group. In some embodiments an alkene group is a $C_1$-$C_{250}$ linear alkene group. In other embodiments, an alkene group is a $C_1$-$C_{250}$ branched alkene group. The choice of the alkene group can result in the surfactant having a linear, branched, star or comb structure. In some embodiments, alkene groups may also be cross linked to provide star and/or cross-linked surfactants. In other embodiments, alkene groups are substantially free of cross-linking.

Provided herein is a method for petroleum recovery or gas recovery from subterranean petroleum or gas formations, the method comprising admixing liquefied carbon dioxide with a solution of an oil and a surfactant to obtain a substantially water-free foam; and injecting the substantially water-free foam into a well;
wherein said surfactant is soluble in oil, does not gel the oil, and comprises two hydrophobic components:
a first hydrophobic component that is miscible with the oil; and a second hydrophobic component that is miscible with liquefied carbon dioxide and non-reactive with carbon dioxide;
wherein the method is a substantially water-free fracking method for petroleum recovery or gas recovery.

The presence of two hydrophobic components in the surfactant allows for generation of stable foams wherein droplets of carbon dioxide are separated by surfactant stabilized thin films of oil.

Figure 1:
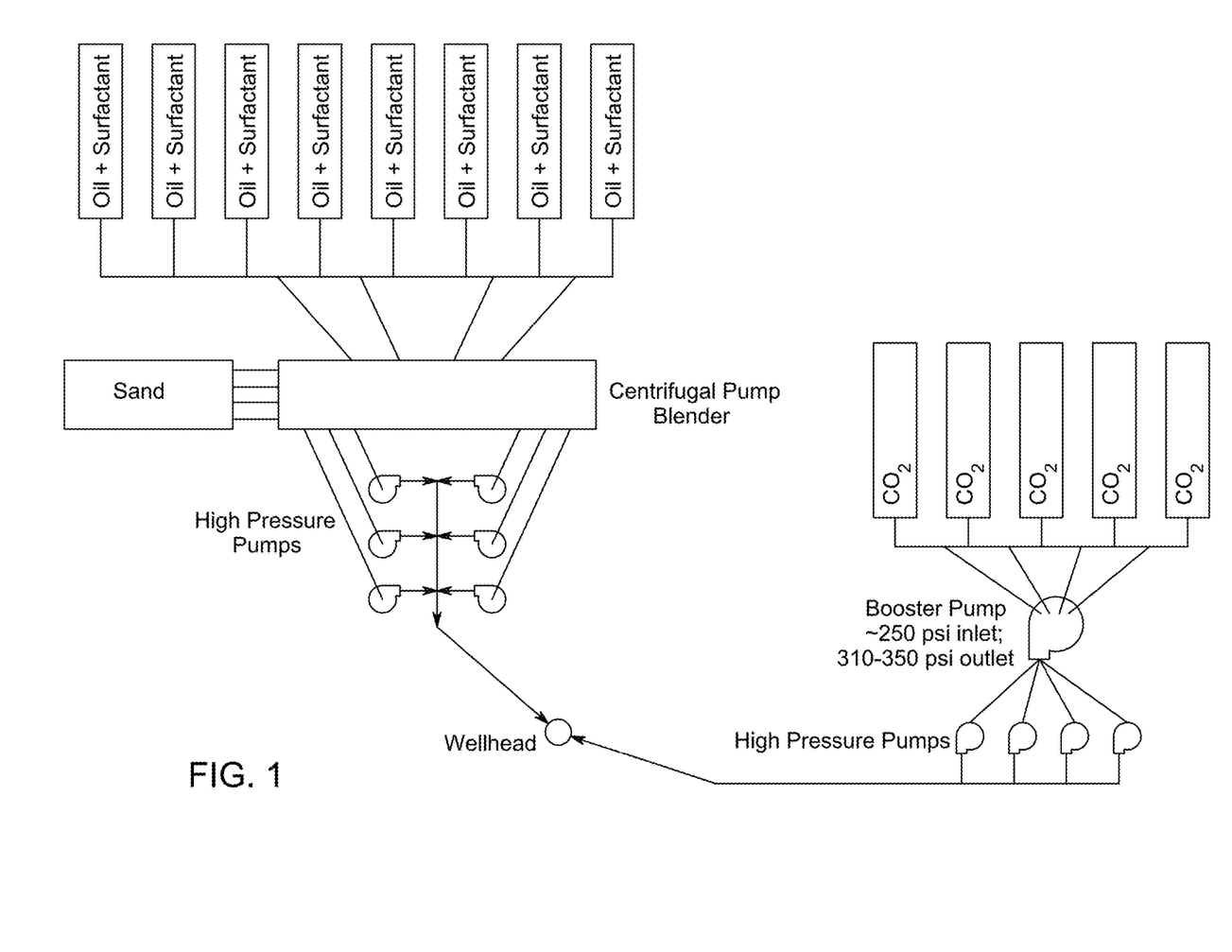
Figure 2A:
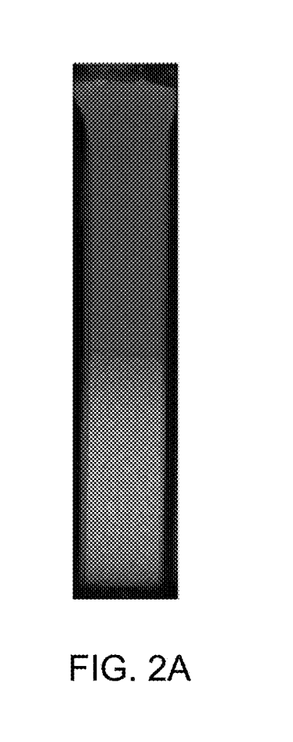
Figure 2B:
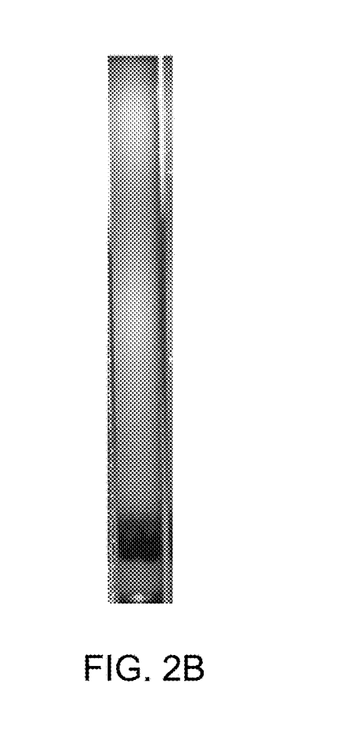
Figure 3:
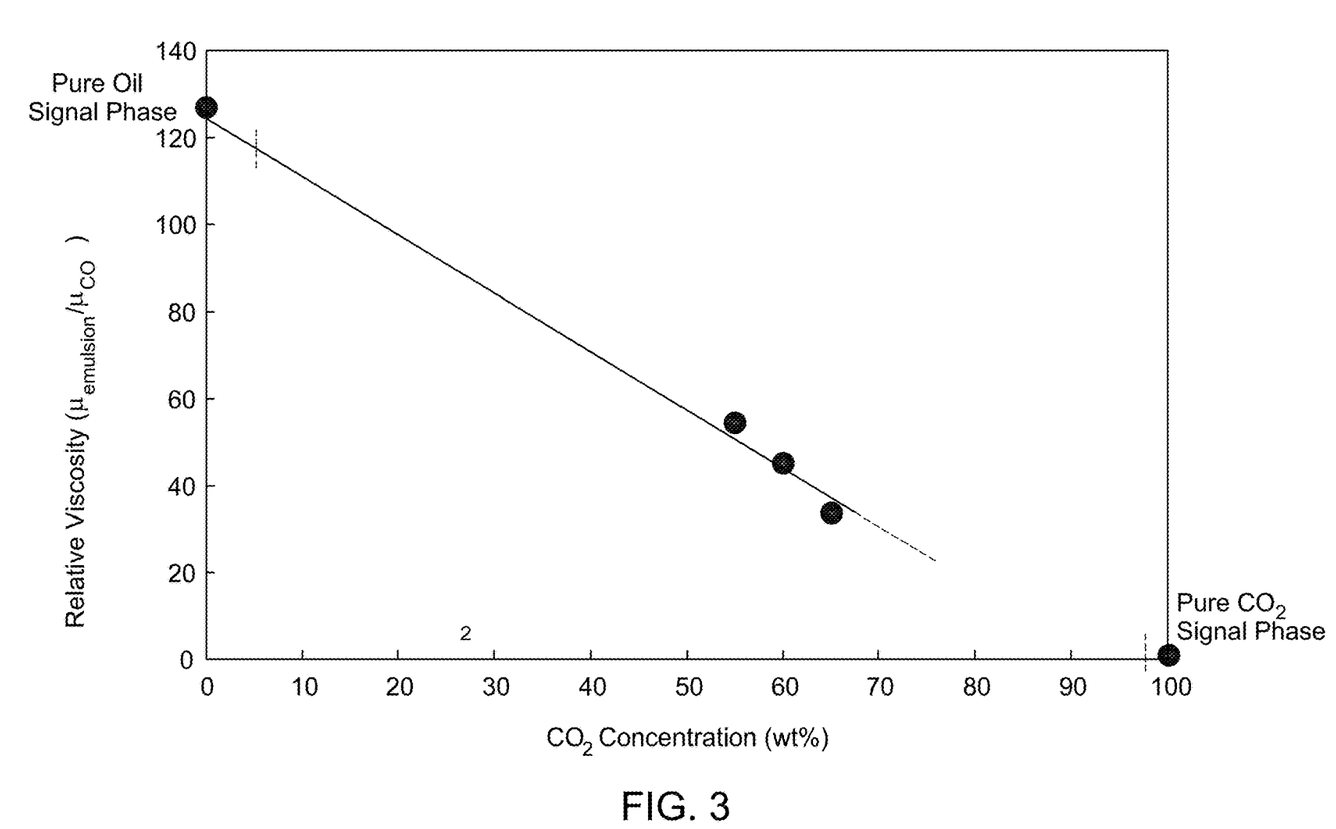
FIG. 3 shows results for viscosity measurement at 25° C., 2500 psi, for a foam comprising surfactant 10. $CO_2$-in-oil emulsions were more viscous than $CO_2$ alone.

As used herein, "solution of an oil and a surfactant" refers to a mixture comprising, consisting essentially of, or consisting of, a surfactant which is miscible in an oil. The surfactant may or may not require heating and cooling, mixing and/or sonication to attain miscibility. The surfactant is a $CO_2$-philic-oil-philic surfactant which forms a solution in an oil that may or may not increase the viscosity of the liquid oil, but will not gel the oil. An emulsion forms as the solution of an oil and a surfactant mixes with liquefied $CO_2$ at the injector wellhead. Droplets of $CO_2$ are separated by surfactant-stabilized films of oil. The $CO_2$-in-oil emulsion is more viscous than pure $CO_2$. Thus the fracking fluid contains no water; only oil, liquid $CO_2$ and a surfactant as described herein. As used herein, a well may be a petroleum well, a gas well, or a well from which both petroleum and natural gas are extracted. After the fracture is formed by the foam (as evidenced by a substantial pressure drop at the injector wellhead), proppants such as sand and alumina are co-injected with the foam (i.e., the stabilized substantially dry foam) typically via blending with the oil that is subsequently pumped to the wellhead along with additional $CO_2$, as shown in FIG. 1. Once a fracture is formed, upon release of pressure, the foam mixture flows out with the natural gas and/or petroleum. Because the foam is a dry foam, there is no need for removal of injected water from the extracted petroleum and/or gas. Accordingly, the method described herein is a substantially water free fracking method, and the method described herein allows for preparation of substantially dry foams comprising, consisting essentially of, or consisting of carbon dioxide, oil and a surfactant as described herein. The emulsion is broken via depressurization during flowback. On other cases, the emulsion is broken over time, by temperature and/or pressure changes, or any combination thereof. In a fractured well that produces crude oil (petroleum), the oil and surfactant will dissolve in the produced crude petroleum and the $CO_2$ can be vented or re-captured. In a fractured well that produces natural gas (no significant crude oil (petroleum) production), the oil and surfactant will be produced and separated from the $CO_2$; the oil-surfactant solution can be re-used and the $CO_2$ can be vented or re-captured.

As used herein, in one embodiment, substantially water-free" means that less than 10% by weight, or less than 5% by weight of water is present in or required for the referenced mixture or operation. In another embodiment, "substantially water-free" refers to about 0% by weight of water in the referenced mixture or operation.

In another aspect, provided herein is a method for petroleum recovery or gas recovery from subterranean petroleum or gas formations, the method comprising
admixing liquefied carbon dioxide with a solution of an oil and a surfactant of Formula I to obtain a substantially water-free foam; and
injecting the substantially water-free foam into a well;
wherein the formula (I) is:

and wherein:
M is $(R_1)_3SiO_p$ where p is 1/2;
D is $R_2R_3S_iO_q$ where q is 2/2;
T is $R_4R_5SiO_r$ where r is 3/2;
Q is $SiO_s$ where s is 4/2;
a ranges from 2 to 10;
x ranges from 8 to 500;
y ranges from 0 to 10;
b ranges from 0 to 10;
each of $R_1$, $R_2$, $R_3$, $R_4$ and $R_5$ is independently, at each occurrence, $C_1$-$C_{250}$ alkyl, or $C_1$-$C_{250}$ alkenyl;
wherein the method is a substantially water-free fracking method for petroleum recovery or gas recovery and wherein Formula I is described in the detailed description section below.

In one group of embodiments, the surfactant of Formula I has a structure of Formula II:

wherein
$R_1$, $R_2$, and $R_3$ are independently $C_1$-$C_6$ alkyl;
$R_4$ and $R_5$ are independently, at each occurrence, $C_1$-$C_{250}$ alkyl; and at least one of $R_4$ or $R_5$ is $C_{12}$-$C_{250}$ alkyl;
x ranges from 8 to 500; and
y ranges from 1 to 10;
where $10<x+y\leq500$.

In some embodiments of Formula II, each $R_1$ is methyl. In some embodiments of Formula II, each $R_1$ is independently methyl, ethyl, propyl, isopropyl, butyl or isobutyl. In some embodiments of Formula II, $R_2$ and $R_3$ are independently methyl, ethyl, propyl, isopropyl, butyl or isobutyl. In some embodiments of Formula II, $R_2$ and $R_3$ are methyl. In some embodiments of Formula II, one of $R_4$ and $R_5$ is $C_1$-$C_6$ alkyl and the other of $R_4$ and $R_5$ is $C_1$-$C_{250}$ alkyl. In some embodiments of Formula II, one of $R_4$ and $R_5$ is $C_1$-$C_6$ alkyl and the other of $R_4$ and $R_5$ is $C_{12}$-$C_{250}$ alkyl. In some embodiments of Formula II, one of $R_4$ and $R_5$ is methyl, ethyl, propyl, isopropyl, butyl or isobutyl and the other of $R_4$ and $R_5$ is $C_{12}$-$C_{250}$ alkyl.

In some embodiments, the surfactant of Formula II has the structure of Formula III:

wherein
each $R_1$ is independently, at each occurrence, $C_1$-$C_6$ alkyl;
x ranges from 8 to 500;
y ranges from 1 to 10;
where $10<x+y\leq500$; and
n ranges from 9 to 250.

In some embodiments of Formula III, each $R_1$ is independently methyl, ethyl, propyl, isopropyl, butyl or isobutyl. In some embodiments of Formula III, n ranges from 9 to 200, 9 to 100, 9 to 50, or 9 to 30. In some embodiments of Formula III, x ranges from 9 to 400, 9 to 300, 9 to 200, 9 to 100, 20 to 100, 30 to 100 or 50 to 100.

In another group of embodiments, the surfactant of Formula I has a structure of Formula IV:

wherein
each $R_1$ is independently, at each occurrence, $C_1$-$C_{250}$ alkyl;
each of $R_2$ and $R_3$ is independently, at each occurrence, $C_1$-$C_6$ alkyl;
with the proviso that at least one $R_1$ is $C_{12}$-$C_{250}$ alkyl; and
$8<x\leq500$.

In some embodiments of Formula IV, each of $R_2$ and $R_3$ is independently methyl, ethyl, propyl, isopropyl, butyl or isobutyl. In some embodiments of Formula IV, one $R_1$ is methyl, ethyl, propyl, isopropyl, butyl or isobutyl, and the other $R_1$ is $C_{12}$-$C_{200}$ alkyl, $C_{20}$-$C_{150}$ alkyl, $C_{25}$-$C_{100}$ alkyl, $C_{12}$-$C_{50}$ alkyl, or $C_{12}$-$C_{30}$ alkyl.

In some embodiments, the surfactant of Formula IV has a structure of Formula V:

wherein
each $R_1$ is independently, at each occurrence, $C_1$-$C_6$ alkyl;
each of $R_2$ and $R_3$ is independently, at each occurrence, $C_1$-$C_6$ alkyl;
$8<x\leq500$; and
n ranges from 9 to 250.

In some embodiments of Formula V, each $R_1$ is independently methyl, ethyl, propyl, isopropyl, butyl or isobutyl. In some embodiments of Formula V, $R_1$ and $R_3$ are independently methyl, ethyl, propyl, isopropyl, butyl or isobutyl. In some embodiments of Formula V, n ranges from 9 to 200, 9 to 100, 9 to 50, or 9 to 30. In some embodiments of Formula V, x ranges from 9 to 400, 9 to 300, 9 to 200, 9 to 100, 20 100, or 30 to 100.

In some embodiments of Formula I, II, III, IV or V, the surfactant comprises at least 50 dimethyl siloxane (DMS) repeating units. In some embodiments of Formula I, II, III, IV or V, the surfactant comprises at least 40 DMS repeating units. In some embodiments of Formula I, II, III, IV or V, the surfactant comprises at least 30 DMS repeating units. In some embodiments of Formula I, II, III, IV or V, the siloxane surfactant has a number average molecular weight of at least 3500 g/mol, at least 4000 g/mol, or at least 5000 g/mol. In some embodiments, a surfactant described herein (i.e., a surfactant of Formula I, II, III, IV or V) comprises molar ratios of DMS monomer units:alkyl side chains of at least 8:1, or at least 10:1. In some embodiments of Formula I, II, III, IV or V, the surfactant comprises at least one hydrocarbon chain comprising at least 12, 15, 20, 25 or 30 carbon atoms. In some embodiments of Formula I, II, III, IV or V, the hydrocarbon chain is a linear hydrocarbon chain; in other embodiments of Formula I, II, III, IV or V, the hydrocarbon chain is a branched hydrocarbon chain; in some of such embodiments, the hydrocarbon chain is a saturated hydrocarbon (i.e., an alkyl chain); in some other of such embodiments, the hydrocarbon chain comprises at least one site of unsaturation (i.e., an alkenyl chain). In some embodiments, the O:Si ratio in the surfactants of Formula I, II, III, IV or V is less than about 1.1, or less than about 1. In some embodiments, the foams described herein are substantially free of co-solvents such as water, or alcohols (e.g., ethylene glycol).

In certain embodiments, the solution of an oil and a surfactant (e.g., surfactant of Formula I, II, III, IV or V) comprises, consists essentially of, or consists of, from about 0.01 weight % to about 10 weight % of the surfactant in the oil. By way of example only, a 10 weight % solution of the surfactant in the oil comprises about 10 g of the surfactant by weight and about 90 g of the oil by weight to provide a 100 g solution of the surfactant in the oil. In certain embodiments, the solution of an oil and a surfactant (e.g., surfactant of Formula I, II, III, IV or V) comprises, consists essentially of, or consists of, from about 0.001 weight % to about 10 weight % of the surfactant in the oil, from about 0.01 weight % to about 8 weight % of the surfactant in the oil, from about 0.01 weight % to about 6 weight % of the surfactant in the oil, from about 0.01 weight % to about 4 weight % of the surfactant in the oil, from about 0.01 weight % to about 2 weight % of the surfactant in the oil, from about 0.1 weight % to about 10 weight % of the surfactant in the oil, from about 0.1 weight % to about 5 weight % of the surfactant in the oil, or from about 0.1 weight % to about 2 weight % of the surfactant in the oil. In another group of embodiments, the solution of an oil and a surfactant (e.g., surfactant of Formula I, II, III, IV or V) comprises, consists essentially of, or consists of, from about 0.1 weight % to about 3 weight % of the surfactant in the oil. In alternate embodiments, the surfactant is added to the oil in an amount of about 1 weight % to about 5 weight % of the weight of the solution of the surfactant in oil.

In some embodiments, from about 30 weight % to about 99 weight % liquefied carbon dioxide is admixed with from about 70 weight % to about 1 weight % of the solution of an oil and a surfactant (e.g., surfactant of Formula I, II, III, IV or V) to obtain a substantially dry foam as described herein. By way of example only, about 95 g of liquefied carbon dioxide is admixed with about 5 g of a solution of an oil and a surfactant to obtain 100 g of an admixture which upon agitation forms a substantially dry foam. In other embodiments, from about 50 weight % to about 75 weight % liquefied carbon dioxide is admixed with from about 50 weight % to about 25 weight % of the solution of an oil and a surfactant (e.g., surfactant of Formula I, II, III, IV or V) to obtain a substantially dry foam as described herein. In additional embodiments, from about 40 weight % to about 65 weight % liquefied carbon dioxide is admixed with from about 60 weight % to about 35 weight % of the solution of an oil and a surfactant (e.g., surfactant of Formula I, II, III, IV or V) to obtain a substantially dry foam as described herein.

In the field, it may be necessary to admix the liquefied carbon dioxide and the solution of an oil and a surfactant based on volumes. Accordingly, in some embodiments, from about 30 volume % to about 99 volume % liquefied carbon dioxide is admixed with from about 70 volume % to about 1 volume % of the solution of an oil and a surfactant (e.g., surfactant of Formula I, II, III, IV or V) to obtain a substantially dry foam as described herein. In other embodiments, from about 50 volume % to about 75 volume % liquefied carbon dioxide is admixed with from about 50 volume % to about 25 volume % of the solution of an oil and a surfactant (e.g., surfactant of Formula I, II, III, IV or V) to obtain a substantially dry foam as described herein. In additional embodiments, from about 40 volume % to about 65 volume % liquefied carbon dioxide is admixed with from about 60 volume % to about 35 volume % of the solution of an oil and a surfactant (e.g., surfactant of Formula I, II, III, IV or V) to obtain a substantially dry foam as described herein.

In some embodiments, the foam comprises from about 30 to about 99 weight % carbon dioxide and from about 70 to about 1 weight % of the solution of an oil and a surfactant. In some embodiments, the foam comprises from about 50 to about 75 weight % carbon dioxide and from about 50 to about 25 weight % of the solution of an oil and a surfactant. In some embodiments, the foam comprises from about 75 to about 95 weight % carbon dioxide and from about 25 to about 5 weight % of the solution of an oil and a surfactant.

In some embodiments, for any methods described above and below, the viscosity of the substantially water-free foam is at least about two times (2×) the initial viscosity, wherein the initial viscosity is the viscosity of the liquefied carbon dioxide prior to admixing the liquefied carbon dioxide with said solution of an oil and a surfactant. In other embodiments, the viscosity of the substantially water-free foam is at least about 5 times (5×), or 10 times (10×) the initial viscosity, wherein the initial viscosity is the viscosity of the liquefied carbon dioxide prior to admixing the liquefied carbon dioxide with said solution of an oil and a surfactant.

In some cases, the substantially water-free foam is stable for a period of up to 10 hours. In other cases, the substantially water-free foam is stable for a period of up to 6 hours. In some cases, the substantially water-free foam is stable for a period of at least 10 hours. In other cases, the substantially water-free foam is stable for a period of at least 6 hours. In some cases, the substantially water-free foam is stable for a period of at least 3 hours. In other cases, the substantially water-free foam is stable for a period of at least 2 hours. In further embodiments, the substantially water-free foam is stable for a period of at least 1 hour.

In some embodiments, the oil in said solution of an oil and a surfactant (e.g., surfactant of Formula I, II, III, IV or V) is crude oil, mineral oil, a plant based oil, diesel, kerosene, gasoline, jet fuel or synthetic oil, or any other oil that the surfactant is miscible with, and that forms two phases when combined with liquefied $CO_2$. In other words, any oil used in the preparation of a solution of an oil and a surfactant is immiscible with liquefied $CO_2$, and miscible with the surfactant.

In one group of embodiments, the methods described above further comprise injecting proppants into the petroleum or gas well. In some of such embodiments, the proppants may be injected simultaneously with the stabilized $CO_2$ foam.

Additional proppants may be injected subsequently with any additional fracking fluid which may be injected into the well.

Within the embodiments described herein, in certain specific embodiments, provided herein is a method for petroleum recovery or gas recovery, the method comprising admixing liquefied carbon dioxide with a solution of an oil and a surfactant of Formula V to obtain a substantially water-free foam; and injecting the substantially water-free foam into a well;

V wherein
each $R_1$ is independently, at each occurrence, $C_1$-$C_6$ alkyl;
each of $R_2$ and $R_3$ is independently, at each occurrence, $C_1$-$C_6$ alkyl;
$8 < x \leq 500$; and
n ranges from 9 to 250;

wherein from about 50 weight % to about 75 weight % liquefied carbon dioxide is admixed with from about 50 weight % to about 25 weight % of the solution of an oil and a surfactant, wherein said solution of an oil and a surfactant comprises about 0.1 weight % to about 3 weight % of the surfactant in the oil;

and wherein the method is a substantially water-free fracking method for petroleum recovery or gas recovery.

Within the embodiments described herein, in certain specific embodiments, provided herein is a method for petroleum recovery or gas recovery, the method comprising admixing liquefied carbon dioxide with a solution of an oil and a surfactant of Formula III to obtain a substantially water-free foam; and injecting the substantially water-free foam into a well;

III wherein
each $R_1$ is independently, at each occurrence, $C_1$-$C_6$ alkyl;
x ranges from 8 to 500;
y ranges from 0 to 10;
where $10 < x+y \leq 500$; and
n ranges from 10 to 30.

wherein from about 50 weight % to about 75 weight % liquefied carbon dioxide is admixed with from about 50 weight % to about 25 weight % of the solution of an oil and a surfactant, wherein said solution of an oil and a surfactant comprises about 0.1 weight % to about 3 weight % of the surfactant in the oil;

and wherein the method is a substantially water-free fracking method for petroleum recovery or gas recovery.

In some instances, additional thickeners may be added to the mixture from which the substantially water free foams are generated, and such embodiments are expressly contemplated within the scope of embodiments described herein. Suitable carbon dioxide and oil thickeners are known to those of ordinary skill in the art. Where, in the practice of the methods described herein, it is sometimes desirable to break the foam after it is recovered from the well, "breaking an emulsion or foam", for the purposes of the disclosure, means to separate the $CO_2$ component of the emulsion or foam from the oil component. Any combination of pressure, temperature and time may be suitable for breaking the emulsion or foam.

EXAMPLES

Several simple compounds were first made as shown in Scheme 1 below. A mono-functional silicone chain 1 with a reactive hydride end-group was allowed to react with a number of α-olefins to form linear AB block copolymers. Six samples containing 12 silicon atoms and chains with 8, 12, 14, 18, 22 and 30 carbons were made (compounds 2-7).

Scheme 1

2 z = 4
3 z = 8
4 z = 10
5 z = 14
6 z = 18
7 z = 26

Comb co-polymers were also synthesized which allowed for more structural variation. Scheme 2 shows 6 materials made that had 2 different hydrocarbon chain lengths and 3 different ratios of dimethylsiloxy and methylalkylsiloxy units.

Scheme 2

8 x = 31, y = 2, z = 26
9 x = 25, y = 6, z = 26
10 x = 81, y = 7, z = 26
11 x = 31, y = 2, z = 8
12 x = 25, y = 6, z = 8
13 x = 81, y = 7, z = 8

Given the successful foam generation for compound 10, several more derivatives were made that explored the structural space around the siloxane backbone. First, the requisite hydrides were made as shown in Scheme 3. Equilibration of existing silicone hydrides with $D_4$ or decamethyltetrasiloxane 14 in the presence of Filtrol F-20 (a sulfuric acid washed clay) followed by filtration and stripping to remove cyclics gave the desired starting materials 15-17. Hydrosilylation with the $C_{30+}$ alpha olefin produced the surfactant compounds 18-20.

Scheme 3. Synthesis of additional surfactants.

HMS-501 x = 8.2, y = 10
HMS-071 x = 32.1, y = 2.1
HMS-151 x = 25.1, y = 5.9
14 x = 2, y = 0

15 x = 80.4, y = 9.2
16 x = 42.1, y = 3.5
17 x = 79.4, y = 3.9

18 x = 80.4, y = 9.2
19 x = 42.1, y = 3.5
20 x = 79.4, y = 3.9

The synthesis of certain PDMS polymers is described in more detail below.

α-Butyl,ω-octyl-PDMS, 2

1-octene (0.84 mL, 5.3 mmol) was added over 1 min to α-butyl,ω-hydrido-PDMS (x=10.1) (5.0 g, 5.3 mmol) containing ~10 μL of Karstedt's catalyst (4.7% wt Pt in xylenes). An exotherm from ambient to 40° C. was noted and the reaction mixture was heated at 50° C. for 3 h after which time any volatiles were removed under vacuum (60° C./1 mm Hg) to give 5.35 g (100%) of a light yellow liquid. $^1$H NMR (CDCl$_3$) δ: 1.4-1.25 (m, 15.8H); 0.92 (t, J=6.9 Hz, 6H). 0.56 (m, 4H); 0.10 (s, 70.7H). $^{13}$C{$^1$H} NMR (CDCl$_3$): 33.46, 31.95, 29.36, 29.27, 26.36, 25.44, 23.21, 22.68, 18.27, 17.95, 14.09, 13.78, 1.15, 1.03, 0.17 ppm.

α-Butyl,ω-dodecyl-PDMS, 3

1-dodecene (0.90 g, 5.4 mmol) was added over 2 min to α-butyl,ω-hydrido-PDMS (x=10.1) (5.0 g, 5.3 mmol) containing ~10 μL of Karstedt's catalyst (4.7% wt Pt in xylenes). An exotherm from ambient to 47° C. was noted and the reaction mixture was heated at 50° C. for 2.5 h after which time any volatiles were removed under vacuum (60° C./1 mm Hg) to give 5.7 g (97%) of a light yellow liquid. $^1$H NMR (CDCl$_3$) δ: 1.39-1.25 (m, 24H); 0.91 (t, J=7.1 Hz, 6H). 0.54 (m, 4H); 0.10 (s, 72H). $^{13}$C{$^1$H} NMR (CDCl$_3$): 33.48, 31.94, 29.73, 29.70, 29.67, 29.63, 29.42, 29.37, 26.36, 25.44, 23.22, 22.70, 18.27, 17.95, 14.11, 13.80, 1.16, 1.04, 0.18 ppm.

α-Butyl,ω-tetradecyl-PDMS, 4

α-Butyl,ω-hydrido-PDMS (x=10.1) (10.0 g, 10.2 mmol) was dissolved in toluene (10 mL), heated to 50° C. and then a solution of the tetradec-1-ene (2.1 g, 10.6 mmol) in toluene (15 mL) was added followed by 1 drop of Karstedt's catalyst (4.7% wt Pt in xylenes). A slight exotherm was noted and the reaction was allowed to continue for 16 h after which the reaction mixture was concentrated in vacuo to give 12.0 g product (100%) as an oil. $^1$H NMR (CDCl$_3$) δ: 1.32 (m, 29H); 0.92 (m, 6.2H). 0.57 (m, 4H); 0.11 (s, 72.5H). $^{13}$C{$^1$H} NMR (CDCl$_3$): 33.48, 31.94, 29.72, 29.67, 29.64, 29.42, 29.38, 26.36, 25.45, 23.23, 22.69, 18.27, 17.95, 14.08, 13.77, 1.13, 1.01, 0.15 ppm.

α-Butyl,ω-octadecyl-PDMS, 5

1-octadecene (1.71 mL, 5.3 mmol) was added over 1 min to α-butyl,ω-hydrido-PDMS (x=10.1) (5.0 g, 5.3 mmol) containing ~10 μL of Karstedt's catalyst (4.7% wt Pt in xylenes). An exotherm from ambient to 32° C. was noted and the reaction mixture was heated at 50° C. for 3 h after which time any volatiles were removed under vacuum (60° C./1 mm Hg) to give 6.18 g (97%) of a light yellow liquid. $^1$H NMR (CDCl$_3$) δ: 1.4-1.25 (m, 36H); 0.92 (t, J=6.7 Hz, 6H). 0.56 (m, 4H); 0.10 (s, 71.1H). $^{13}$C{$^1$H} NMR (CDCl$_3$): 33.48, 31.74, 29.71, 29.67, 29.64, 29.42, 29.37, 26.36, 25.45, 23.23, 22.69, 18.27, 17.95, 14.10, 13.79, 1.15, 1.03, 0.17 ppm.

α-Butyl,ω-docosyl-PDMS, 6

α-Butyl,ω-hydrido-PDMS (x=10.1) (10.0 g, 10.2 mmol) was dissolved in toluene (20 mL), heated to 50° C. and then a solution of the docos-1-ene (3.3 g, 10.6 mmol) in toluene (10 mL) was added followed by 1 drop of Karstedt's catalyst (4.7% wt Pt in xylenes). A slight exotherm was noted and the reaction was allowed to continue for 17 h after which the reaction mixture was concentrated in vacuo to give 12.8 g product (97%) as an oil. $^1$H NMR (CDCl$_3$) δ: 1.34-1.38 (m, 45.6H); 0.94 (t, J=7.0 Hz, 6.5H). 0.58 (m, 4H); 0.14 (s, 74.6H). $^{13}$C{$^1$H} NMR (CDCl$_3$): 33.48, 31.94, 29.71, 29.67, 29.64, 29.43, 29.37, 26.36, 25.45, 23.23, 22.69, 18.25, 17.95, 14.10, 13.78, 1.15, 1.03, 0.17 ppm.

α-Butyl,ω-triacontyl-PDMS, 7

α-Butyl,ω-hydrido-PDMS (x=10.1) (10.0 g, 10.2 mmol) was dissolved in toluene (10 mL), heated to 50° C. and then a solution of the triacont-1-ene (4.6 g, 10.9 mmol) in toluene (30 mL) was added followed by 1 drop of Karstedt's catalyst (4.7% wt Pt in xylenes). A slight exotherm was noted and the reaction was allowed to continue for 4 h. NMR analysis indicated a small amount of Si—H remaining so an additional 90 mg of olefin was added. After 7 h, the reaction mixture was concentrated in vacuo (16 h, 75° C./1 mm Hg) to give 13.5 g product (94%) as a low melting wax. $^1$H NMR (CDCl$_3$) δ: 1.28 (s, 73H); 0.91 (t, J=7.0 Hz, 8.2H). 0.54 (m, 4H); 0.10 (s, 84H). $^{13}$C{$^1$H} NMR (CDCl$_3$): 33.48, 31.93, 29.70, 29.43, 29.37, 26.36, 25.44, 23.23, 22.68, 18.27, 17.95, 14.11, 13.79, 1.15, 1.04, 0.17 ppm.

Comb Co-Polymer 8

Siloxane hydride co-polymer (10.0 g, 3.85 mmol, Gelest HMS-071) was dissolved in toluene (10 mL), warmed to 50° C. and then treated with triacont-1-ene (3.5 g, 8.3 mmol) in toluene (32 mL) and then 2 drops of Karstedt's catalyst (4.7% wt Pt in xylenes). Heating continued for 5 h and then an additional 0.45 g of olefin was added. After 20 h the reaction mixture was concentrated in vacuo (70° C./1 mm Hg) to give 11.8 g (88%) product. $^1$H NMR (CDCl$_3$) δ: 1.28 (s, 223H); 0.91 (m, 16H). 0.54 (m, 4H); 0.10 (s, 336H). Peaks at 5.4 and 2.0 were also seen for isomers of the internal olefin. Some integral in 1.28 and 0.91 were also due to internal olefins. $^{13}$C{$^1$H} NMR (CDCl$_3$): 33.36, 32.50, 31.93, 29.70, 29.37, 22.97, 22.69, 17.50, 14.11, 1.77, 1.02, −0.48 ppm.

Comb Co-Polymer 9

Siloxane hydride co-polymer (10.0 g, 4.2 mmol, Gelest HMS-151) was dissolved in toluene (10 mL), warmed to 50° C. and then treated with triacont-1-ene (10.9 g, 25.9 mmol) in toluene (40 mL) and then 2 drops of Karstedt's catalyst (4.7% wt Pt in xylenes). Heating continued for 5 h and then an additional 0.45 g of olefin was added. After 20 h the reaction mixture was concentrated in vacuo (70° C./1 mm Hg) to give 18.6 g (91%) product. $^1$H NMR (CDCl$_3$) δ: 1.36 (s, 456H); 0.94 (t, J=7.1 Hz, 31.7H). 0.54 (m, 11.8H); 0.13 (s, 236H). Peaks at 5.4 and 2.0 were also seen for isomers of the internal olefin. Some integral in 1.28 and 0.91 were also due to internal olefins. $^{13}$C{$^1$H} NMR (CDCl$_3$): 33.44, 32.64, 31.97, 29.75, 29.41, 23.01, 22.73, 17.53, 14.13, 1.79, 1.05, −0.46 ppm.

Comb Co-Polymer 10

Siloxane hydride co-polymer (10.0 g, 1.52 mmol, Gelest HMS-082) was dissolved in toluene (10 mL), warmed to 50° C. and then treated with triacont-1-ene (4.6 g, 10.9 mmol) in toluene (30 mL) and then 2 drops of Karstedt's catalyst (4.7% wt Pt in xylenes). Heating continued for 5 h and then an additional 0.60 g of olefin was added. After 20 h the reaction mixture was concentrated in vacuo (70° C./1 mm Hg) to give 13.1 g (92%) product. $^1$H NMR (CDCl$_3$) δ: 1.28 (s, 690H); 0.94 (t, J=7.0 Hz, 51.7H). 0.54 (m, 13.6H); 0.10 (s, 7496H). Peaks at 5.4 and 2.0 were also seen for isomers of the internal olefin. Some integral in 1.28 and 0.91 were also due to internal olefins. $^{13}$C{$^1$H} NMR (CDCl$_3$): 33.36, 32.50, 31.93, 29.70, 29.37, 22.97, 22.69, 17.50, 14.11, 1.77, 1.02, −0.49 ppm.

Comb Co-Polymer 11

1-Dodecene (1.7 g, 10.1 mmol) was added to siloxane hydride co-polymer (10.0 g, 3.85 mmol, Gelest HMS-071) and then 1 drop of Karstedt's catalyst (4.7% wt Pt in xylenes). Heating continued for 5 h and then the reaction mixture was concentrated in vacuo (70° C./1 mm Hg) to give 11.1 g (97%) product. $^1$H NMR (CDCl$_3$) δ: 1.30 (s, 48H);

0.91 (t, J=7.0 Hz, 7.9H). 0.52 (m, 4.2H); 0.12 (s, 232H). $^{13}C\{^1H\}$ NMR (CDCl$_3$): 33.34, 31.93, 29.72, 29.70, 29.66, 29.63, 29.41, 29.37, 22.98, 22.68, 17.50, 14.09, 1.76, 1.01, −0.49 ppm.

Comb Co-Polymer 12

1-Dodecene (4.8 g, 28.5 mmol) was added to siloxane hydride co-polymer (10.0 g, 4.2 mmol, Gelest HMS-151) and then 1 drop of Karstedt's catalyst (4.7% wt Pt in xylenes). Heating continued for 5 h and then the reaction mixture was concentrated in vacuo (70° C./1 mm Hg) to give 13.3 g (95%) product. $^1H$ NMR (CDCl$_3$) δ: 1.30 (s, 129H); 0.91 (t, J=7.0 Hz, 20.6H). 0.52 (m, 11.8H); 0.12 (s, 204H). $^{13}C\{^1H\}$ NMR (CDCl$_3$): 33.35, 31.94, 29.72, 29.68, 29.38, 22.97, 22.70, 17.50, 14.09, 1.75, 1.01, −0.49 ppm.

Comb Co-Polymer 13

1-Dodecene (2.13, 12.6 mmol) was added to siloxane hydride co-polymer (10.0 g, 1.52 mmol, Gelest HMS-082) and then 1 drop of Karstedt's catalyst (4.7% wt Pt in xylenes). Heating continued for 3 h and then the reaction mixture was concentrated in vacuo (70° C./1 mm Hg) to give 10.6 g (91%) product. $^1H$ NMR (CDCl$_3$) δ: 1.30 (s, 151H); 0.91 (t, J=7.0 Hz, 24H). 0.52 (m, 13.6H); 0.12 (s, 576H). $^{13}C\{^1H\}$ NMR (CDCl$_3$): 33.34, 31.92, 29.72, 29.70, 29.66, 29.63, 29.41, 29.37, 22.98, 22.68, 17.50, 14.09, 1.76, 1.01, −0.50 ppm.

$MD_{80.4}D^H_{9.2}M$, 15

A mixture of HMS-501 (Gelest, $MD_{8.2}DH_{10}M$, 25 g), D$_4$ (106 g) and Filtrol F-25 (2 g) were heated for 18 h at 65° C. and then filtered and stripped at 160° C./1 mm Hg for 2 h to give 112 g product.

$MD_{42.1}D^H_{3.5}M$, 16

A mixture of HMS-501 (Gelest, $MD_{8.2}DH_{10}M$, 47 g), D$_4$ (270 g), decamethyltetrasiloxane (20 g) and Filtrol F-20 (2 g) were heated for 18 h at 65° C. and then filtered and stripped at 160° C./1 mm Hg for 2 h to give 331 g product. $^1H$ NMR (CDCl$_3$) δ: 4.72 (s, 3.5H); 0.12 (s, 317H). $^{29}Si$ NMR (CDCl$_3$): 9.45, 7.38 (2Si); −20.3 to −22.1 (42.1Si); −36.5 to −37.8 (3.47Si).

$MD_{79.4}D^H_{3.9}M$, 17

A mixture of HMS-071 (Gelest, $MD_{32.1}DH_{2.1}M$, 20 g), HMS-151 (Gelest, $MD_{25.1}DH_{5.9}M$), D$_4$ (59 g) and Filtrol F-20 (2 g) were heated for 18 h at 65° C. and then filtered and stripped at 160° C./1 mm Hg for 2 h to give 68.9 g product. $^1H$ NMR (CDCl$_3$) δ: 4.71 (s, 3.94H); 0.12 (s, 569H). $^{29}Si$ NMR (CDCl$_3$): 7.20 (2Si); −20.6 to −22.1 (79.4Si); −36.6 to −37.6 (3.94Si).

$MD_{80.4}D'_{9.2}M$, 18

Siloxane hydride co-polymer (7.5 g, 1.1 mmol) was dissolved in toluene (50 mL), warmed to 50° C. and then treated with triacont-1-ene (4.4 g, 10.5 mmol) in toluene (20 mL) and then 2 drops of Karstedt's catalyst (4.7% wt Pt in xylenes). Heating continued for 1 h and then 0.38 g additional triacont-1-ene was added. After 2 more h, 2 ml of 1-hexene was added. After 4.5 h no Si—H remained by proton NMR and the reaction mixture was concentrated in vacuo (70° C./1 mm Hg) to give 11.9 g (102%) product. $^1H$ NMR (CDCl$_3$) δ: 1.30 (s, 685H); 0.92 (m, 54H). 0.54 (m, 18.4H); 0.12 (s, 650H). $^{13}C\{^1H\}$ NMR (CDCl$_3$): 33.37, 32.98, 32.63, 31.95, 31.64, 29.72, 29.39, 22.98, 22.92, 22.71, 22.00, 17.50, 14.09, 1.75, 1.01, −0.49 ppm.

$MD_{42.1}D'_{3.5}M$, 19

Siloxane hydride co-polymer (10.0 g, 2.87 mmol) was dissolved in toluene (40 mL), warmed to 50° C. and then treated with triacont-1-ene (4.2 g, 10.0 mmol) in toluene (10 mL) and then 2 drops of Karstedt's catalyst (4.7% wt Pt in xylenes). Heating continued for 20 h and then 0.45 g of 1-hexene was added. After 2 h the reaction mixture was concentrated in vacuo (70° C./1 mm Hg) to give 13.7 g (96%) product. $^1H$ NMR (CDCl$_3$) δ: 1.26 (s, 277H); 0.91 (t, J=6.5 Hz, 20.0H). 0.54 (m, 7.0H); 0.11 (s, 428H). $^{13}C\{^1H\}$ NMR (CDCl$_3$): 33.34, 32.61, 31.94, 29.71, 28.43, 28.38, 28.16, 22.97, 22.68, 17.48, 14.06, 1.71, 1.04, 0.98, −0.52 ppm.

$MD_{79.4}D'_{3.9}M$, 20

Siloxane hydride co-polymer (10.0 g, 1.59 mmol) was dissolved in toluene (40 mL), warmed to 50° C. and then treated with triacont-1-ene (2.68 g, 6.38 mmol) in toluene (20 mL) and then 2 drops of Karstedt's catalyst (4.7% wt Pt in xylenes). Heating continued for 4 h and then 0.3 g of 1-hexene was added. After 18 h the reaction mixture was concentrated in vacuo (70° C./1 mm Hg) to give 11.7 g (93%) product. $^1H$ NMR (CDCl$_3$) δ: 1.32 (s, 300H); 0.91 (t, J=6.7 Hz, 24.0H). 0.54 (m, 7.88H); 0.11 (s, 727H). $^{13}C\{^1H\}$ NMR (CDCl$_3$): 33.36, 32.99, 32.63, 31.97, 31.65, 29.73, 29.40, 22.99, 22.93, 22.71, 22.60, 17.50, 14.08, 1.73, 1.07, 0.99, −0.50 ppm.

Emulsions were prepared with 40 milliliters of 2 weight % surfactant in mineral oil solution or dispersion (Philips 66 mineral oil 110N) along with a single small particle of red dye (Oil Red EGN supplied by Sigma-Aldrich) that was oil soluble but $CO_2$ insoluble. The surfactants typically required heating and stirring in the oil to disperse and/or dissolve with more time needed for higher molecular weight samples. Sample stabilities and viscosities in high pressure environments (i.e. mixtures of the surfactant in mineral oil along with $CO_2$) were assessed in a high pressure variable volume view cell equipped with a magnetic impeller as detailed elsewhere [Xing, D, $CO_2$ mobility control using direct thickeners and foaming agents, Doctoral Dissertation, 2013, University of Pittsburgh; McLendon et al., J. Pet. Sci. Eng. 119 (2014) 196-209. 2014].

Emulsion Stability

After loading the dyed oil mixture into the cylindrical Pyrex sample volume tube, an equal volume of $CO_2$ was injected into the sample volume at a pressure and temperature of 2500 psi and 25° C. The system inlet valve was then closed to ensure that a constant overall composition was retained throughout the experiment. The sample volume was then expanded until a pressure of 1500 psi is obtained and the contents are stirred with a slotted-blade impeller at the top of the sample volume at max impeller speed of 2500 rpm for 20 minutes. Immediately after cessation of stirring, emulsion stability was tracked over an hour via observation of interface formation and movement along the metered length of view window. One or more of these "phases" could occur: an excess mineral oil phase would appear as a transparent red liquid; an excess $CO_2$ phase would appear as a transparent colorless liquid; a $CO_2$-in-oil emulsion could appear as clear bubbles of $CO_2$ separated by films of red oil; and a $CO_2$-in-oil emulsion with tiny cell sizes would appear as an opaque light pink fluid (depending on bubble size, closer inspection may reveal small droplets of clear liquid ($CO_2$) separated by films of red liquid (mineral oil). In some cases, highly stable emulsions with extremely small emulsion cell sizes encompassing the entire sample volume remained dense and opaque with minimal or no interface formation (i.e. an external mineral oil phase did not form due to film drainage, and an excess clear $CO_2$ phase did not form due to bubble coalescence) throughout the experiment timeframe. In this case the bubbles were so small that the compositions of the internal (bubble, discontinuous) and continuous (film, continuous) phases were not immediately apparent in these samples.

The stabilities at 2500 and 5000 psi were also assessed via compression of the sample volume before stirring. A phase inversion occurs between 1500 and 2500 psi where the clear, less dense $CO_2$ rich phase at 1500 psi migrates from the top of the volume to the bottom half upon compression to 2500 psi.

Emulsion Viscosity

Upon identification of a surfactant capable of emulsifying the entire sample volume, the same preparation procedure is used for viscosity measurements with the addition of a Pyrex sphere to the sample volume prior addition of $CO_2$. In other words, the entire length of the sample volume is needed for accurate viscosity measurements; therefore viscosity was measured on systems containing surfactants capable of emulsifying the entire contents of the sample volume. The view cell is rapidly inverted and the terminal velocity of the sphere at conditions of interest is recorded and compared to the terminal velocity in pure $CO_2$ at the same conditions giving an apparent viscosity of the emulsion. For example, a sphere fall time that is twice as slow in an emulsion as in pure $CO_2$ would represent an apparent emulsion viscosity twice than that of pure $CO_2$.

The Pyrex sphere also served to identify the internal and continuous phases by providing a more narrow path for light transmission between its diameter and the cylinder wall circumventing emulsion opacity. For example, if one observes isolated clear distended droplets flowing around the falling sphere surrounded by a continuous red phase, the emulsion was deemed to be $CO_2$-in-oil since the red dye is $CO_2$-insoluble.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of fracking subterranean petroleum or gas formations, the method comprising
   admixing liquefied carbon dioxide with a solution of an oil and a surfactant of Formula I to obtain a substantially water-free foam; and
   injecting the substantially water-free foam into a well formed in the subterranean petroleum or gas formation, at a pressure sufficient to create a fissure or to open an existing fissure;
   wherein the formula (I) is:

$M_a D_x T_y Q_b$;

and wherein:
   M is $(R_1)_3 SiO_p$ where p is 1/2;
   D is $R_2 R_3 SiO_q$ where q is 2/2;
   T is $R_4 R_5 SiO_r$ where r is 3/2;
   Q is $SiO_s$ where s is 4/2;
   a ranges from 2 to 10;
   x ranges from 8 to 500;
   y ranges from 0 to 10;
   b ranges from 0 to 10;
   each of $R_1$, $R_2$, $R_3$, $R_4$, and $R_5$ is independently, at each occurrence, $C_1$-$C_{250}$ alkyl, or $C_1$-$C_{250}$ alkenyl;
   wherein the method is a substantially water-free fracking method.

2. The method of claim 1, wherein the surfactant of Formula I has a structure of Formula II:

wherein
   $R_1$, $R_2$, and $R_3$ are independently $C_1$-$C_6$ alkyl;
   $R_4$ and $R_5$ are independently, at each occurrence, $C_1$-$C_{250}$ alkyl, provided at least one of $R_4$ or $R_5$ is $C_{12}$-$C_{250}$ alkyl;
   x ranges from 8 to 500; and
   y ranges from 1 to 10;
   where $10 < x+y \leq 500$.

3. The method of claim 2, wherein the surfactant of Formula II has the structure of Formula III:

wherein
   each $R_1$ is independently, at each occurrence, $C_1$-$C_6$ alkyl;
   x ranges from 8 to 500;
   y ranges from 1 to 10;
   where $10 < x+y \leq 500$; and
   n ranges from 9 to 250.

4. The method of claim 3, wherein the surfactant comprises at least 50 dimethyl siloxane repeating units.

5. The method of claim 2, wherein each $R_1$ is methyl.

6. The method of claim 2, wherein each $R_2$ and $R_3$ are methyl.

7. The method of claim 2, wherein the surfactant comprises at least 50 dimethyl siloxane repeating units.

8. The method of claim 1, wherein the surfactant of Formula I has a structure of Formula IV:

wherein
   each $R_1$ is independently, at each occurrence, $C_1$-$C_{250}$ alkyl;
   each of $R_2$ and $R_3$ is independently, at each occurrence, $C_1$-$C_6$ alkyl;
   with the proviso that at least one $R_1$ is $C_{12}$-$C_{250}$ alkyl; and
   $8 < x \leq 500$.

9. The method of claim 8, wherein the surfactant of Formula IV has a structure of Formula V:

V wherein
  each $R_1$ is independently, at each occurrence, $C_1$-$C_6$ alkyl;
  each of $R_2$ and $R_3$ is independently, at each occurrence, $C_1$-$C_6$ alkyl;
  $8 < x \leq 500$; and
  n ranges from 9 to 250.

10. The method of claim 1, wherein the solution of an oil and a surfactant comprises from about 0.01 weight % to about 10 weight % of the surfactant in the oil.

11. The method of claim 1, wherein the solution of an oil and a surfactant comprises from about 0.1 weight % to about 3 weight % of the surfactant in the oil.

12. The method of claim 1, wherein from about 30 weight % to about 99 weight % liquefied carbon dioxide is admixed with from about 70 weight % to about 1 weight % of the solution of an oil and a surfactant.

13. The method of claim 1, wherein from about 50 weight % to about 75 weight % liquefied carbon dioxide is admixed with from about 50 weight % to about 25 weight % of the solution of an oil and a surfactant.

14. The method of claim 1, wherein a viscosity of the substantially water-free foam is at least about two times (2×) an initial viscosity, wherein the initial viscosity is the viscosity of the liquefied carbon dioxide prior to admixing the liquefied carbon dioxide with said solution of an oil and a surfactant.

15. The method of claim 1, wherein the substantially water-free foam is stable for a period of up to 10 hours.

16. The method of claim 1, wherein the substantially water-free foam is stable for a period of up to 6 hours.

17. The method of claim 1, wherein the oil in said solution of an oil and a surfactant is crude oil, mineral oil, a plant based oil, diesel, kerosene, gasoline, jet fuel or synthetic oil.

18. The method of claim 1, further comprising injecting proppants into the petroleum or gas well.

19. A method of fracking subterranean petroleum or gas formations, the method comprising
  admixing liquefied carbon dioxide with a solution of an oil and a surfactant of Formula III to obtain a substantially water-free foam; and
  injecting the substantially water-free foam into a well formed in the subterranean petroleum or gas formation, at a pressure sufficient to create a fissure or to force open an existing fissure;
wherein the formula (III) is:

wherein
  each $R_1$ is independently, at each occurrence, $C_1$-$C_6$ alkyl;
  x ranges from 8 to 500;
  y ranges from 0 to 10;
  where $10 < x+y \leq 500$; and
  n ranges from 10 to 30;
and further wherein from about 50 weight % to about 75 weight % liquefied carbon dioxide is admixed with from about 50 weight % to about 25 weight % of the solution of an oil and a surfactant, wherein said solution of an oil and a surfactant comprises about 0.1 weight % to about 3 weight % of the surfactant in the oil;
  and wherein the method is a substantially water-free fracking method.

* * * * *